US010244306B1

(12) United States Patent
Ku et al.

(10) Patent No.: US 10,244,306 B1
(45) Date of Patent: Mar. 26, 2019

(54) REAL-TIME DETECTION OF FEEDBACK INSTABILITY

(71) Applicant: BOSE CORPORATION, Framingham, MA (US)

(72) Inventors: Emery M. Ku, Somerville, MA (US); David J. Warkentin, Boston, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/988,221

(22) Filed: May 24, 2018

(51) Int. Cl.

| | |
|---|---|
| ***H04B 15/00*** | (2006.01) |
| ***H04R 1/10*** | (2006.01) |
| ***H04R 3/00*** | (2006.01) |
| ***G10K 11/178*** | (2006.01) |
| ***H04R 5/033*** | (2006.01) |
| ***H04R 1/22*** | (2006.01) |

(52) U.S. Cl.
CPC ..... *H04R 1/1083* (2013.01); *G10K 11/17854* (2018.01); *H04R 1/222* (2013.01); *H04R 3/002* (2013.01); *H04R 5/033* (2013.01); *H04R 2460/01* (2013.01)

(58) Field of Classification Search
CPC ...... H04R 1/1083; H04R 1/222; H04R 3/002; G10K 11/17854
See application file for complete search history.

(56) References Cited

U.S. PATENT DOCUMENTS 6,118,878 A 9/2000 Jones
6,480,610 B1 * 11/2002 Fang .................... H04R 25/453 381/318
8,155,334 B2 4/2012 Joho et al.
8,600,069 B2 * 12/2013 Lee ........................... H04S 7/00 381/71.11
8,798,283 B2 8/2014 Gauger, Jr. et al.
2006/0198538 A1 * 9/2006 Malvar .............. H03H 21/0012 381/95
2008/0219434 A1 * 9/2008 Liu ......................... H04M 9/08 379/406.08
2010/0135483 A1 6/2010 Mohammad et al.
2011/0170699 A1 * 7/2011 Schoerkmaier ...... G10K 11/178 381/71.1
2012/0057720 A1 3/2012 Van Leest
2016/0125866 A1 5/2016 Park et al.
2017/0110106 A1 4/2017 Kumar et al.
2017/0365245 A1 12/2017 Ku

FOREIGN PATENT DOCUMENTS

EP 0814456 A2 12/1997

* cited by examiner

*Primary Examiner* — Simon King
(74) *Attorney, Agent, or Firm* — Bose Corporation

(57) ABSTRACT

Audio systems and methods are provided that detect instability in active feedback noise reduction circuitry. An acoustic transducer converts a driver signal into an acoustic signal, and a microphone provides a feedback signal. The feedback signal is processed, through a first transfer function, to provide an anti-noise signal. The driver signal is based at least in part upon the anti-noise signal, to reduce acoustic noise in the environment of the acoustic transducer. The driver signal is also filtered by a filter having a second transfer function that is inverse of the first transfer function, to provide a reference signal. The feedback signal is compared to the reference signal to determine a feedback instability, based upon the comparison.

20 Claims, 7 Drawing Sheets

REAL-TIME DETECTION OF FEEDBACK INSTABILITY

BACKGROUND

Various audio devices incorporate active noise reduction (ANR) features, also known as active noise control or cancellation (ANC), in which one or more microphones detect sound, such as exterior acoustics captured by a feedforward microphone or interior acoustics captured by a feedback microphone. Signals from a feedforward microphone and/or a feedback microphone are processed to provide anti-noise signals to be fed to an acoustic transducer (e.g., a speaker, driver) to counteract noise that may otherwise be heard by a user. Feedback microphones pick up acoustic signals produced by the driver, and thereby form a closed loop system that could become unstable at times or under certain conditions. Various audio systems that may provide feedback noise reduction include, for example, headphones, earphones, headsets and other portable or personal audio devices, as well as automotive systems to reduce or remove engine and/or road noise, office or environmental acoustic systems, and others. In various situations it is therefore desirable to detect when a condition of feedback instability exists.

SUMMARY OF THE INVENTION

Aspects and examples are directed to audio systems, devices, and methods that detect instability in a feedback noise reduction system. The systems and methods operate to detect when a plant transfer function (e.g., from a driver signal to a feedback microphone) becomes similar to the reciprocal of a transfer function of a feedback filter (applied to the microphone signal) such that the closed loop system may exhibit instability by, for example, having a loop gain of unity at one or more frequencies.

According to one aspect, a headphone system is provided that includes an acoustic transducer to convert a driver signal into an acoustic signal, a microphone to provide a feedback signal, a first processing component configured to process the feedback signal and provide an anti-noise signal, the anti-noise signal being related to the feedback signal by a first transfer function, and the driver signal being based at least in part upon the anti-noise signal, a filter to filter the driver signal and provide a reference signal, the filter configured to have a second transfer function that is inverse of the first transfer function, and a second processing component to compare the feedback signal to the reference signal to determine a feedback instability based upon the comparison.

In some examples, the second processing component is configured to compare the feedback signal to the reference signal by calculating a cross-correlation.

In various examples, the second processing component is configured to compare the feedback signal to the reference signal by calculating a first envelope of a sum of the comparison and feedback signals and calculating a second envelope of a difference between the comparison and feedback signals. In certain examples, the second processing component may be configured to compare the feedback signal to the reference signal by further calculating a ratio of the first envelope to the second envelope.

In certain examples, the second processing component is configured to determine the feedback instability in response to the comparison exceeding a threshold over a predetermined number of samples.

In some examples, the second processing component is configured to compare the feedback signal to the reference signal over a predetermined frequency range.

In various examples, the first processing component is further configured to cause one or more adjustments to one or more parameters responsive to the second processing component determining the feedback instability.

According to another aspect, a method of detecting feedback instability in a noise control system is provided. The method includes providing a driver signal to an acoustic transducer for conversion to an acoustic signal, receiving a feedback signal from a feedback microphone, processing the feedback signal through a feedback transfer function to provide an anti-noise signal, processing the driver signal through a filter having a transfer function that is inverse to the feedback transfer function, to provide a reference signal, comparing the feedback signal to the reference signal, determining whether the feedback signal has a threshold similarity to the reference signal, and indicating a feedback instability in response to determining that the feedback signal has a threshold similarity to the reference signal.

In some examples, determining whether the feedback signal has a threshold similarity to the reference signal includes determining a similarity over a predetermined number of samples.

In various examples, determining whether the feedback signal has a threshold similarity to the reference signal includes calculating a cross-correlation between the feedback signal and the reference signal.

According to various examples, determining whether the feedback signal has a threshold similarity to the reference signal includes calculating a first envelope of a sum of the reference signal and the feedback signal and calculating a second envelope of a difference between the reference signal and the feedback signal. In certain examples, quantifying the similarity further includes calculating a ratio of the first envelope to the second envelope.

In certain examples the feedback signal and the reference signal may be band limited to a predetermined frequency range.

Various examples include generating one or more control signals for adjusting one or more parameters of the noise control system responsive to determining that the feedback signal has a threshold similarity to the reference signal.

According to another aspect, a personal acoustic device is provided that includes an acoustic transducer to convert a driver signal into an acoustic signal, a microphone to provide a feedback signal, a first filter to filter the feedback signal and provide an anti-noise signal, the driver signal being based at least in part upon the anti-noise signal, a second filter to filter the driver signal and provide a reference signal, the second filter having an inverse response of the first filter, and a processing component to compare the feedback signal to the reference signal to determine a feedback instability based upon the comparison.

In various examples, the processing component may be configured to compare the feedback signal to the reference signal by correlating the feedback signal and the reference signal. In some examples, correlating the feedback signal and the reference signal includes calculating a first envelope of a sum of the comparison and feedback signals and calculating a second envelope of a difference between the comparison and feedback signals. In certain examples, correlating the feedback signal and the reference signal may further include calculating a ratio of the first envelope to the second envelope.

In some examples, the processing component is configured to determine the feedback instability in response to a correlation exceeding a threshold over a predetermined number of samples.

In certain examples, the processing component is configured to compare the feedback signal to the reference signal over a predetermined frequency range.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by identical or similar numerals. For purposes of clarity, not every component may be labeled in every figure. In the figures.

DETAILED DESCRIPTION

Figure 1:
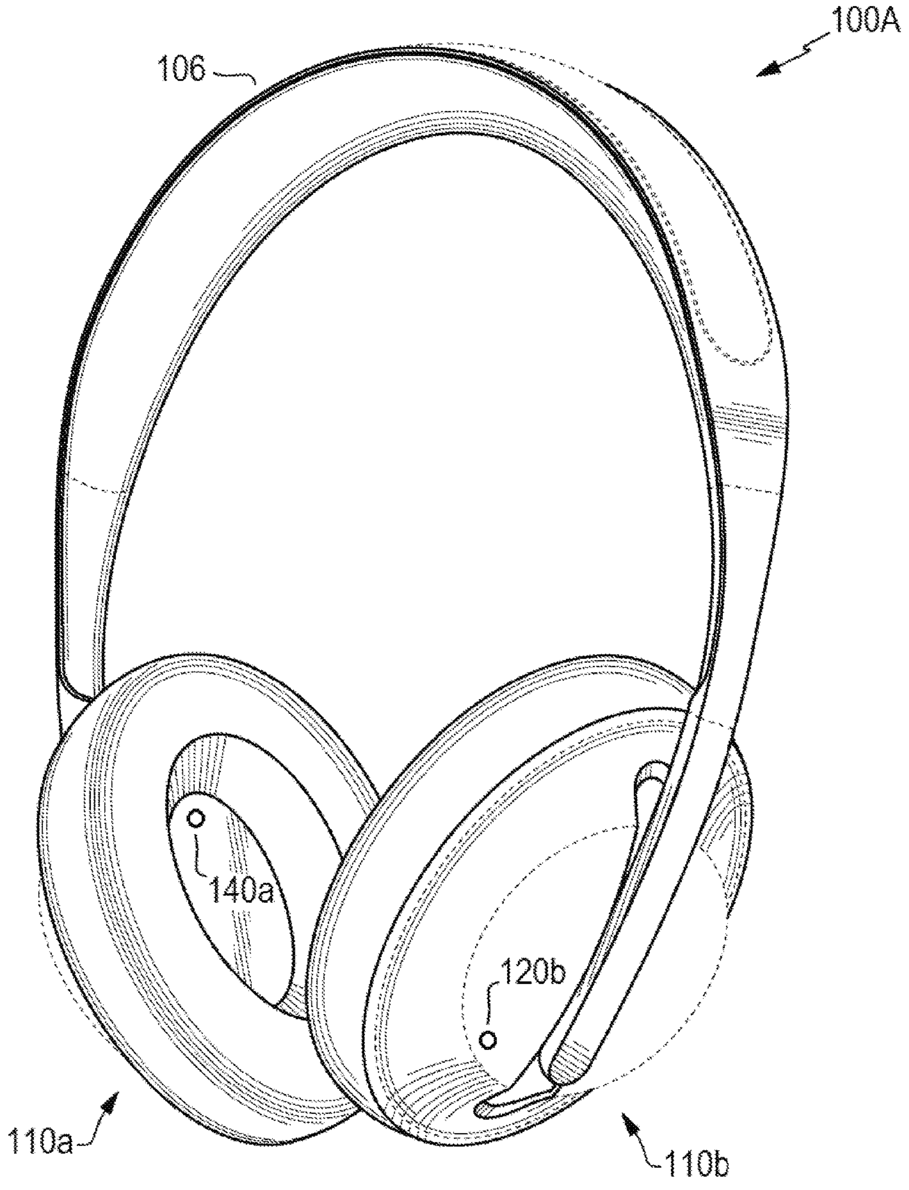
FIG. 1 is a perspective view of one example headset form factor.

Aspects of the present disclosure are directed to noise cancelling headphones, headsets, or other audio systems, and methods, that detect instability in the noise canceling system. Noise cancelling systems operate to reduce acoustic noise components heard by a user of the audio system. Noise cancelling systems may include feedforward and/or feedback characteristics. A feedforward component detects noise external to the headset (e.g., via an external microphone) and acts to provide an anti-noise signal to counter the external noise expected to be transferred through to the user's ear. A feedback component detects acoustic signals reaching the user's ear (e.g., via an internal microphone) and processes the detected signals to counteract any signal components not intended to be part of the user's acoustic experience. Examples disclosed herein may be coupled to, or placed in connection with, other systems, through wired or wireless means, or may be independent of any other systems or equipment.

The systems and methods disclosed herein may include or operate in, in some examples, headsets, headphones, hearing aids, or other personal audio devices, as well as acoustic noise reduction systems that may be applied to home, office, or automotive environments. Throughout this disclosure the terms "headset," "headphone," "earphone," and "headphone set" are used interchangeably, and no distinction is meant to be made by the use of one term over another unless the context clearly indicates otherwise. Additionally, aspects and examples in accord with those disclosed herein are applicable to various form factors, such as in-ear transducers or earbuds and on-ear or over-ear headphones, and others.

Examples disclosed may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For various components described herein, a designation of "a" or "b" in the reference numeral may be used to indicate "right" or "left" versions of one or more components. When no such designation is included, the description is without regard to the right or left and is equally applicable to either of the right or left, which is generally the case for the various examples described herein. Additionally, aspects and examples described herein are equally applicable to monaural or single-sided personal acoustic devices and do not necessarily require both of a right and left side.

Figure 2:
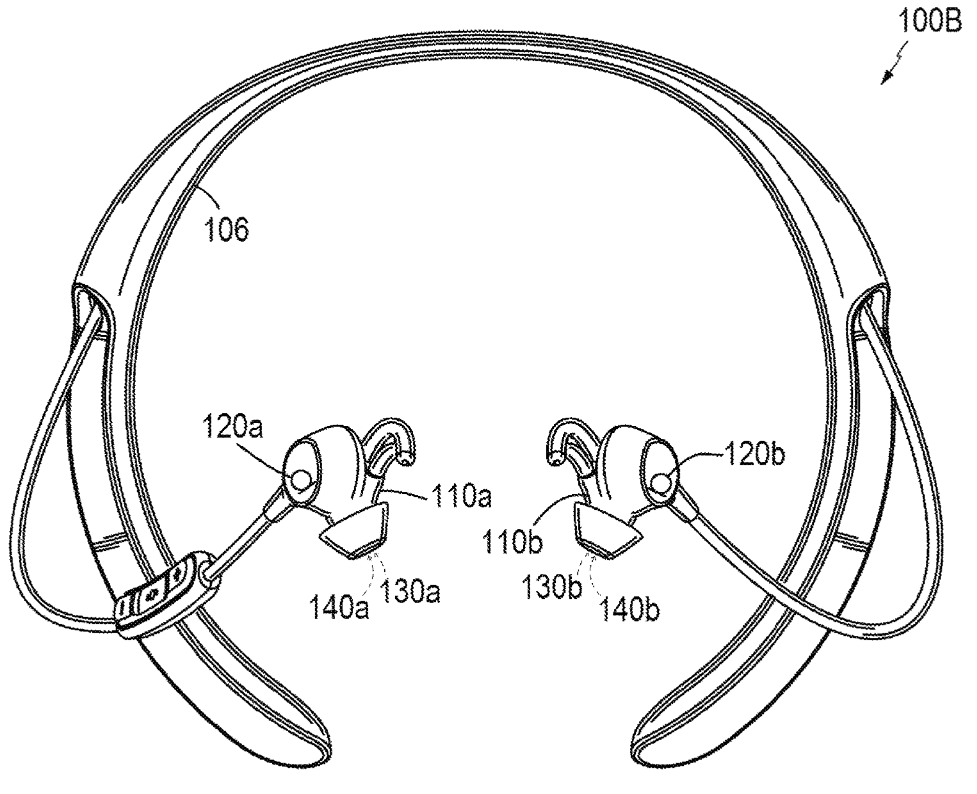
FIG. 2 is a perspective view of another example headset form factor.

FIGS. 1 and 2 illustrate two example headsets 100A, 100B. Each headset 100 includes a right earpiece 110*a* and a left earpiece 110*b*, intercoupled by a supporting structure 106 (e.g., a headband, neckband, etc.) to be worn by a user. In some examples, two earpieces 110 may be independent of each other, not intercoupled by a supporting structure. Each earpiece 110 may include one or more microphones, such as a feedforward microphone 120 and/or a feedback microphone 140. The feedforward microphone 120 may be configured to sense acoustic signals external to the earpiece 110 when properly worn, e.g., to detect acoustic signals in the surrounding environment before they reach the user's ear. The feedback microphone 140 may be configured to sense acoustic signals internal to an acoustic volume formed with the user's ear when the earpiece 110 is properly worn, e.g., to detect the acoustic signals reaching the user's ear. Each earpiece also includes a driver 130, which is an acoustic transducer for conversion of, e.g., an electrical signal, into an acoustic signal that the user may hear. In various examples, one or more drivers may be included in an earpiece, and an earpiece may in some cases include only a feedforward microphone or only a feedback microphone.

While the reference numerals 120 and 140 are used to refer to one or more microphones, the visual elements illustrated in the figures may, in some examples, represent an acoustic port wherein acoustic signals enter to ultimately reach such microphones, which may be internal and not physically visible from the exterior. In examples, one or more of the microphones 120, 140 may be immediately adjacent to the interior of an acoustic port, or may be removed from an acoustic port by a distance, and may include an acoustic waveguide between an acoustic port and an associated microphone.

Figure 3:
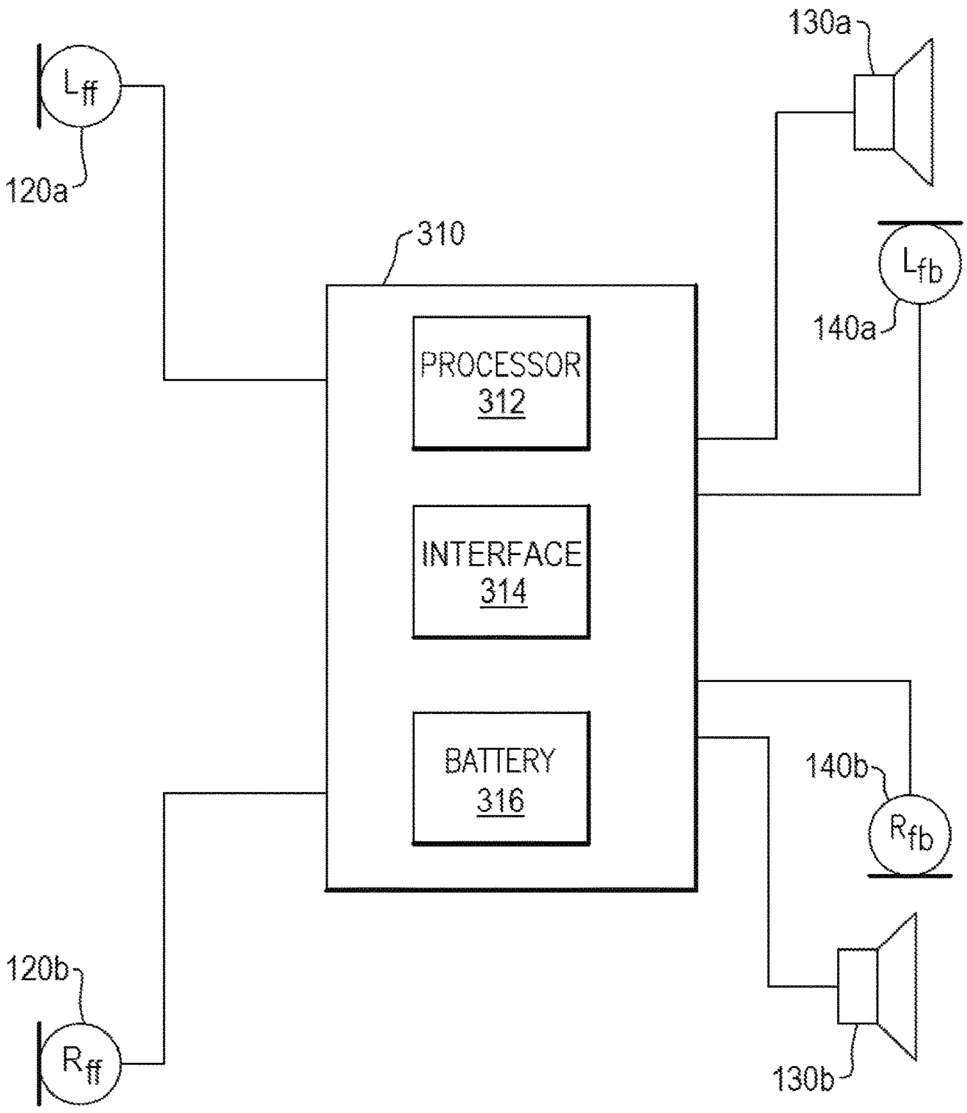
FIG. 3 is a schematic block diagram of an example audio processing system that may be incorporated into various audio systems.

Shown in FIG. 3 is an example of a processing unit 310 that may be physically housed somewhere on or within the headset 100. The processing unit 310 may include a processor 312, an audio interface 314, and a battery 316. The processing unit 310 may be coupled to one or more feedforward microphone(s) 120, driver(s) 130, and/or feedback microphone(s) 140, in various examples. In various examples, the interface 314 may be a wired or a wireless interface for receiving audio signals, such as a playback audio signal or program content signal, and may include further interface functionality, such as a user interface for receiving user inputs and/or configuration options. In various examples, the battery 316 may be replaceable and/or rechargeable. In various examples, the processing unit 310 may be powered via means other than or in addition to the battery 316, such as by a wired power supply or the like. In some examples, a system may be designed for noise reduction only and may not include an interface 314 to receive a playback signal.

Figure 4:
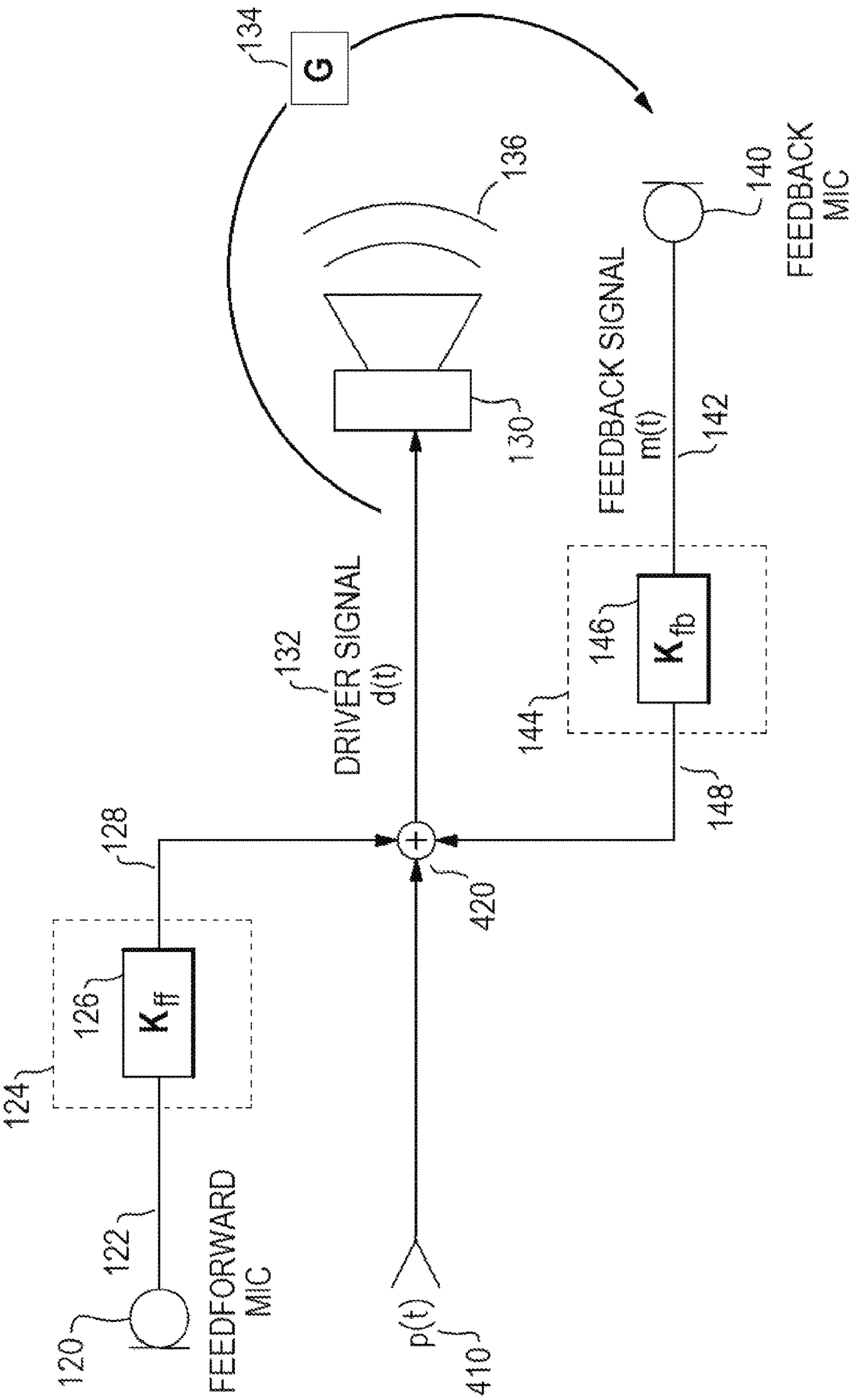
FIG. 4 is a schematic diagram of an example noise reduction system incorporating feedforward and feedback components.

FIG. 4 illustrates a system and method of processing microphone signals to reduce noise reaching the user's ear. FIG. 4 presents a simplified schematic diagram to highlight features of a noise reduction system. Various examples of a complete system may include amplifiers, analog-to-digital conversion (ADC), digital-to-analog conversion (DAC), equalization, sub-band separation and synthesis, and other signal processing or the like. In some examples, a playback signal 410, p(t), may be received to be rendered as an acoustic signal by the driver 130. The feedforward microphone 120 may provide a feedforward signal 122 that is processed by a feedforward processor 124, having a feedforward transfer function 126, $K_{ff}$, to produce a feedforward anti-noise signal 128. The feedback microphone 140 may provide a feedback signal 142 that is processed by a feedback processor 144, having a feedback transfer function 146, $K_{fb}$, to produce a feedback anti-noise signal 148. In various examples, any of the playback signal 410, the feedforward anti-noise signal 128, and/or the feedback anti-noise signal 148 may be combined, e.g., by a combiner 420, to generate a driver signal 132, d(t), to be provided to the driver 130. In various examples, any of the playback signal 410, the feedforward anti-noise signal 128, and/or the feedback anti-noise signal 148 may be omitted and/or the components necessary to support any of these signals may not be included in a particular implementation of a system.

Various examples described herein include a feedback noise reduction system, e.g., a feedback microphone 140 and a feedback processor 144 having a feedback transfer function 146 to provide a feedback anti-noise signal 148 for inclusion in a driver signal 132. The feedback microphone 140 may be configured to detect sound within the acoustic volume that includes the user's ear and, accordingly, may detect an acoustic signal 136 produced by the driver 130, such that a loop exists. Accordingly, in various examples and/or at various times, a feedback loop may exist from the driver signal 132 through the driver 130 producing an acoustic signal 136 that is picked up by the feedback microphone 140, processed through the feedback transfer function 146, $K_{fb}$, and included in the driver signal 132. Accordingly, at least some components of the feedback signal 142 are caused by the acoustic signal 136 rendered from the driver signal 132. Alternately stated, the feedback signal 142 includes components related to the driver signal 132.

The electrical and physical system shown in FIG. 4 exhibits a plant transfer function 134, G, characterizing the transfer of the driver signal 132 through to the feedback signal 142. In other words, the response of the feedback signal 142 to the driver signal 132 is characterized by the plant transfer function 134, G. The system of the feedback noise reduction loop is therefore characterized by the combined (loop) transfer function, $GK_{fb}$. If the loop transfer function, $GK_{fb}$, becomes equal to unity, $GK_{fb}=1$, at one or more frequencies, the loop system may diverge, causing at least one frequency component of the driver signal 132 to progressively increase in amplitude. This may be perceived by the user as an audible artifact, such as a tone or squealing, and may reach a limit at a maximum amplitude the driver 130 is capable of producing, which may be extremely loud. Accordingly, when such a condition exists, the feedback noise reduction system may be described as unstable.

Various examples of an earpiece 110 with a driver 130 and a feedback microphone 140 may be designed to avoid feedback instability, e.g., by designing to avoid or minimize the chances of the loop transfer function, $GK_{fb}$, having undesirable characteristics. Despite various quality designs, a loop transfer function, $GK_{fb}$, may nonetheless exhibit instability at various times or under certain conditions, e.g., by action of the plant transfer function 134, G, changing due to movement or handling of the earpiece 110 by the user, such as when putting a headset on or off, or adjusting the earpiece 110 while worn. In some cases, a fit of the earpiece 110 may be less than optimal or may be out of the norm and may provide differing coupling between the driver 130 and the feedback microphone 140 than anticipated. Accordingly, the plant transfer function 134, G, may change at various times to cause an instability in the feedback noise reduction loop. In some examples, processing by the feedback processor 144 may include active processing that may change a response or transfer function, such as by including one or more adaptive filters or other processing that may change the feedback transfer function, $K_{fb}$, at various times. Such changes as these may cause (or remedy) an instability in the feedback noise reduction loop.

Accordingly, various example systems and methods described herein operate to monitor for a condition in which a loop transfer function, $GK_{fb}$, becomes equal to unity, $GK_{fb}=1$, and to indicate that a feedback instability exists when so. With continued reference to FIG. 4, when the loop transfer function equals unity, such may be equivalently expressed as the plant transfer function 134, G, being the inverse (e.g., reciprocal) of the feedback transfer function 146, $K_{fb}$, thereby satisfying the expression, $G=K_{fb}^{-1}$. Accordingly, a feedback noise reduction system may be unstable when a plant transfer function (e.g., 134) is the inverse of a feedback transfer function (e.g., 146).

As discussed previously, the feedback signal 142 may include components of the driver signal 132. When a feedback instability exists, components of the feedback signal 142 may be related to the driver signal 132 by the inverse of the feedback transfer function 146, because during an instable condition the plant transfer function 134 may be inversely related to the feedback transfer function 146. Various systems and methods in accord with those described herein may detect feedback instability by monitoring for components in the feedback signal 142 being related to the driver signal 132 such that the relationship is the inverse of the feedback transfer function 146. In some examples, the driver signal 132 is filtered by the inverse of the feedback transfer function 146 and the resulting signal is compared to the feedback signal 142. A threshold level of similarity may indicate that the plant transfer function 134 is nearly equal to the inverse of the feedback transfer function 146, and thus may indicate that a feedback instability exists.

Figure 5:
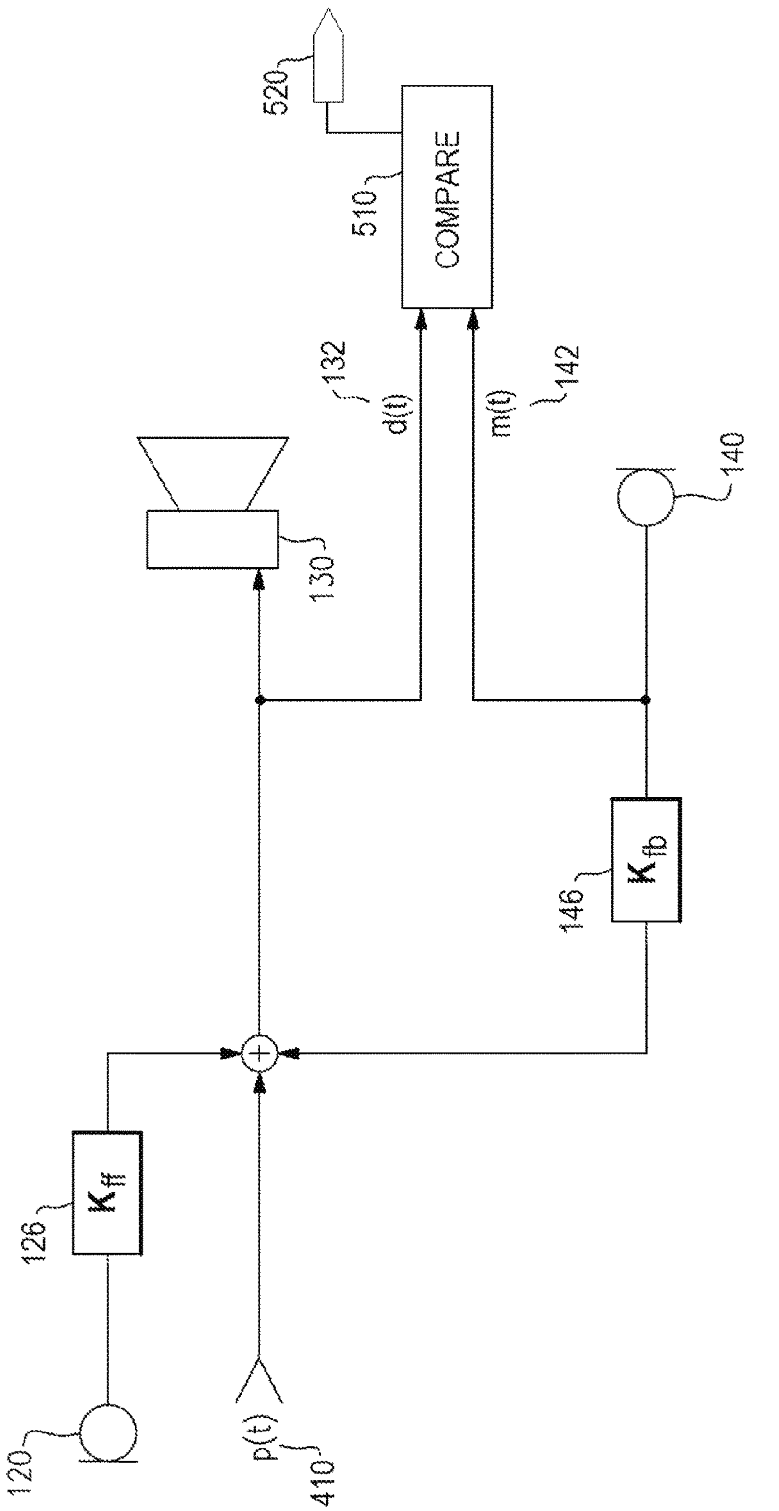
FIG. 5 is a schematic diagram of an example system for instability detection.

With reference to FIG. 5, an example system and method is shown wherein the feedback signal 142 is compared to the driver signal 132 by a comparator 510, and if their relationship is similar to the inverse of the feedback transfer function 146, an instability indicator 520 may be provided. The instability indicator 520 may be, for example, a flag, indicator, or logic level signal (e.g., having high and low output levels) to indicate the presence or absence of instability, or may be any suitable type of signal for interpretation by various other components. For example, other components may receive the instability indicator 520 and may take action in response to an instability, such as reducing a gain in the feedback transfer function 146 (e.g., at one or more frequencies or frequency ranges).

Figure 6:
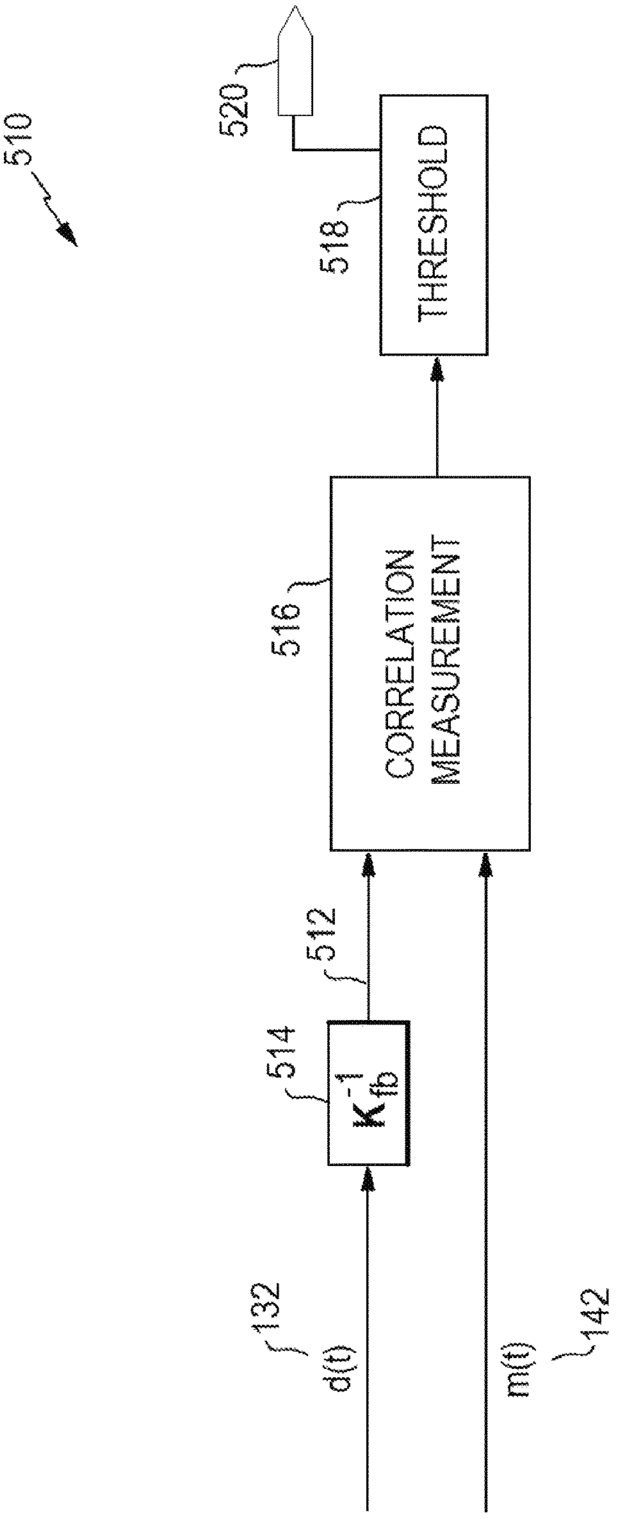
FIG. 6 is a schematic diagram of another example system for instability detection.

With reference to FIG. 6, at least one example of a comparator 510 is illustrated, suitable for comparing whether the feedback signal 142 is related to the driver signal 132 by an inverse of the feedback transfer function 146. The driver signal 132 is received and processed by a filter 514 having a transfer function, $K_{fb}^{-1}$, that is the inverse of the feedback transfer function 146 to provide a reference signal 512. In some examples, a delay may be applied to the feedback signal 142 to align the feedback signal 142 with the reference signal 512 (e.g., to match a delay added by the filter 514). A correlation measurement 516 is made between the feedback signal 142 and the reference signal 512, to quantify their similarity, and if their similarity meets a threshold 518, an instability is indicated by the instability indicator 520, which is an output signal of the comparator 510. In various examples, the correlation measurement 516 may be any of various measurements to correlate signals. In some examples, a cross-correlation may be calculated between the feedback signal 142 and the reference signal 512. In various examples, signal envelopes and/or signal energies in various sub-bands may be measured and compared, and/or various smoothing and/or weighting may be applied in various instances, and/or other processing to quantify a relationship between the feedback signal 142 and the reference signal 512. In various examples, the threshold 518 may apply a threshold level (e.g., of the quantified similarity) necessary to decide that an instability exists, and may also apply a threshold timeframe, such as an amount of time the similarity must remain above the threshold level. In some examples, an amount of time and/or a delay before indicating that an instability exists may be defined by a minimum number of samples, e.g., of the correlation of sampled signals in a digital domain, meeting the threshold level.

In some examples, multiple correlation measurements may be made, each of which may be compared to a threshold, any one or more of which may be deemed required to indicate an instability. For example, two distinct correlation measurements may be implemented in certain examples, and both may be required to meet a threshold to indicate an instability. In further examples, if one of the two distinct correlation measurements exceeds a higher threshold, such may be sufficient to indicate an instability even though the other of the two distinct correlation measurements fails to meet its threshold. In yet further examples, a third correlation measurement having its own threshold may confirm and/or over-ride the indication of instability generated by the first two correlation measurements, and the like.

Figure 7:
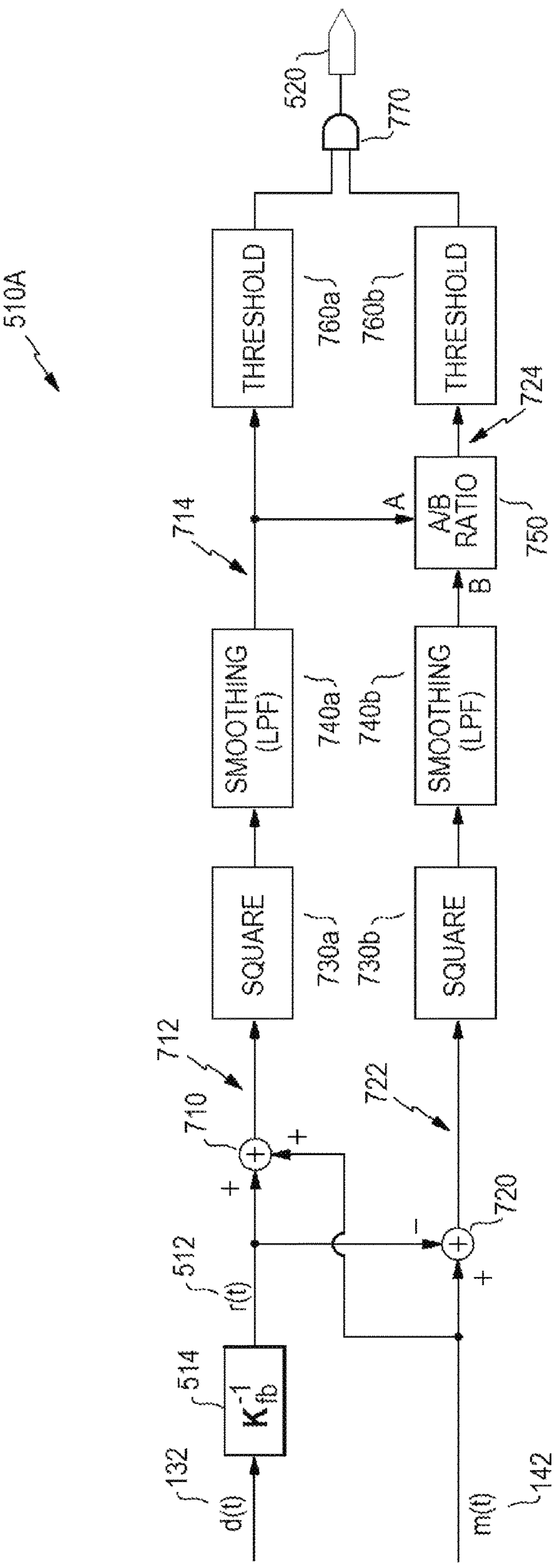
FIG. 7 is a schematic diagram of another example system for instability detection.

Referring to FIG. 7, a further example of a comparator 510A is illustrated. As above, with reference to FIG. 6, the driver signal 132 is filtered (e.g., by filter 514) through an inverse transfer function, $K_{fb}^{-1}$, of the feedback transfer function 146, and the resulting reference signal 512 is compared to the feedback signal 142. In some examples, the reference signal 512 may be a predictive signal, in that it may predict the feedback signal 142 during times of feedback instability (as discussed previously), such that comparison of the feedback signal 142 to the reference signal 512 may be used to detect that instability exists.

With reference to FIG. 7, the example comparator 510A includes a combiner 710 that adds the reference signal 512 to the feedback signal 142 to provide a summed signal 712, and a combiner 720 that subtracts the reference signal 512 from the feedback signal 142 (or vice versa, in other examples) to provide a difference signal 722. As described above, a feedback instability may exist when $G=K_{fb}^{-1}$, causing the reference signal 512 to be predictive of the feedback signal 142. Accordingly, when the feedback signal 142 is similar to the reference signal 512, an instability may exist. Further, when the feedback signal 142 is similar to the reference signal 512, the summed signal 712 may be expected to have relatively large amplitude and signal energy and the difference signal 722 may be expected to have relatively small amplitude and signal energy.

In some examples, each of the summed signal 712 and the difference signal 722 may be processed by a squaring block 730 and a smoothing block 740. For example, squaring a signal yields an output that is always positive and may be considered indicative of a signal energy. Smoothing a signal mitigates rapid changes in the signal, which may be considered low pass filtering, which may provide or be considered a signal envelope. Smoothing may be applied in various ways. At least one example may include alpha smoothing, in which each new signal sample, s[n], received over time (e.g., in a digital domain) is added to a running average of the prior samples, s_avg[n−1], according to a weighting factor, α, as illustrated by equation (1).

$$s\_avg[n]=\alpha s[n]+(1-\alpha)s\_avg[n-1] \quad (1)$$

The weighting factor, α, may be considered a tunable time constant, for example. It should be recognized that various signal processing may be performed in either of an analog or digital domain in various examples, and that various signals may be equivalently expressed with either of a time parameter, t, or a digital sample index, n. In various examples, the weighting factor, α, may be the same in the two smoothing blocks 740. In other examples, the weighting factor, α, may be different for the two smoothing blocks 740.

With continued reference to FIG. 7, squaring and smoothing the summed signal 712 provides a primary signal 714 that is expected to have a relatively large value when an instability exists. By contrast, the difference signal 722 is expected to have relatively low amplitude, such that a squared and smoothed version is expected to have a relatively low value. In some examples, a ratio 750 may be taken, to provide a relative signal 724, which provides a single signal indicative of the extent to which both the summed signal 712 is large and the difference signal 722 is small, relative to each other. Accordingly, the relative signal 724 is expected to have a relatively large value when an instability exists.

Each of the primary signal 714 and the relative signal 724 may be tested against a respective threshold 760, each of which may apply varying thresholds, including a quantity threshold and optionally a time threshold (e.g., the amount of time, or number of digital samples, that a quantity threshold must be met). In various examples, a threshold 760*a* for the primary signal 714 may be a fixed or variable threshold, selected based upon various aspects and/or settings (e.g., gain) related to various components of the system overall, such as a level of the driver signal 132. The threshold 760*b* for the relative signal 724, may also be a fixed or variable threshold selected based upon various aspects, components, and/or settings of the system. In various examples, either or both of the thresholds 760 may be selected based upon testing and characterization of the system as a whole, under conditions that cause instability and conditions that don't cause instability. In some examples, the threshold 760*b* is a fixed threshold in a range of 5 to 25 dB. In certain examples, the threshold 760*b* is a fixed threshold in a range of 12 to 18 dB, and in particular examples may be 12 dB, 15 dB, 18 dB, or other values.

With continued reference to FIG. 7, a logic 770 may combine outputs from the thresholds 760. In the example of FIG. 7, the logic 770 applies AND logic, requiring both of the primary signal 714 and the relative signal 724 to meet its respective threshold 760*a*, 760*b*. In some examples, a minimum time and/or number of digital samples may be applied by the logic 770, e.g., a minimum number of samples that each of the primary signal 714 and the relative signal 724, potentially in combination, must meet its respective threshold 760, 760*b*. Various examples may user other combinations for logic 770, which may also incorporate signals from additional processing. In some examples, either of the primary signal 714 or the relative signal 724 meeting the respective threshold 760 may be deemed sufficient to produce the output instability indicator 520. In some examples, additional thresholds 760 may be applied to the signals shown and/or other signals. For instance, an additional threshold may be applied to the relative signal 724 that, when met, may be incorporated by the logic 770 to produce the output instability indicator 520 even if the primary signal 714 fails to meet the threshold 760*a*.

According to some examples, a system may be tested and characterized and may be determined to be more likely to exhibit feedback instability at one or more frequencies and/or one or more frequency sub-bands. Accordingly, in some examples, the various processing illustrated, e.g., in FIGS. 6-7, may be performed within a range of frequencies and/or one or more sub-bands in which the instability is likely to occur. Additionally or alternately, each of a number of sub-bands or frequency ranges may have differing parameters applied by the various processing. For example, a threshold 760*b* may be a fixed value for one sub-band of the relative signal 724 and a different fixed value for another sub-band of the relative signal 724.

According to some examples, a system may be tested and characterized and may be determined to be more likely to exhibit high signal energies at one or more frequencies and/or one or more frequency sub-bands even though no feedback instability exists. Accordingly, in some examples, the various processing illustrated, e.g., in FIGS. 6-7, may be configured to omit or ignore one or more sub-bands and/or range of frequencies.

According to some examples, a system may be tested and characterized and may be determined that more complex or less complex signal processing and/or logic may be beneficially applied to one or more sub-bands or frequency ranges than to others. Accordingly, in some examples, the various processing illustrated, e.g., in FIGS. 6-7, may vary significantly for differing ranges of frequencies and/or one or more sub-bands.

In various examples, as described above, detection of a feedback instability is accomplished by analyzing a relationship between a feedback microphone signal and a driver signal (e.g., by comparison of the feedback signal 142 to the driver signal 132) and an instability indicator 520 is provided. When the instability indicator 520 indicates that a feedback instability is detected, various systems and methods in accord with aspects and examples herein may take varying actions in response to the feedback instability, e.g., to mitigate or remove the feedback instability and/or the undesirable consequences of the instability. For example, an audio system in accord with those described may alter or replace the feedback transfer function 146, alter a feedback controller or feedback processor 144, change to a less aggressive form of feedback noise reduction, alter various parameters of the noise reduction system to be less aggressive, alter a driver signal amplitude (e.g., mute, reduce, or limit the driver signal 132), alter a processing phase response, e.g., of the driver signal 132 and/or feedback signal 142, in an attempt to disrupt the instability, provide an indicator to a user (e.g., an audible or vocal message, an indicator light, etc.), and/or other actions.

The above described aspects and examples provide numerous potential benefits to a personal audio device that includes feedback noise reduction. Stability criteria for feedback control may be defined by an engineer at the controller design stage, and various considerations assume a limited range of variation (of system characteristics) over the lifetime of the system. For example, driver output and microphone sensitivity may vary over time and contribute to the electroacoustic transfer function between the driver and the feedback microphone. Further variability may impact design criteria, such as production variation, head-to-head variation, variation in user handling, and environmental factors. Any such variations may cause stability constraints to be violated, and designers must conventionally take a conservative approach to feedback system design to ensure that instability is avoided. Such an instability may cause the noise reduction system to add undesired signal components rather than reduce them, thus conventional design practices may take highly conservative approaches to avoid an instability occurring, potentially at severe costs to system performance.

However, aspects and examples of detecting feedback instability, as described herein, allow corrective action to be taken to remove the instability when such condition occurs, allowing system designers to design systems that operate under conditions nearer to a boundary of instability, and thus achieve improved performance over a wider feedback bandwidth. Aspects and examples herein allow reliable detection if or when the instability boundary is crossed. For example, in an in-ear noise cancelling headphone, a user's handling may commonly block the "nozzle" of an earbud (e.g., a finger momentarily covering the audio port), which may cause an extreme physical change to the electroacoustic coupling between the driver and the feedback microphone. Conventional systems need to be designed to avoid instability even with a blocked nozzle, but instability detection in accord with aspects and examples described herein allow the feedback controller or processor to be designed without the "blocked nozzle" condition as a constraint. Accordingly, systems and methods herein may more than double the range of bandwidth in which noise reduction by a feedback processor may be effective.

In various examples, any of the functions of the systems and methods described herein may be implemented or carried out in a digital signal processor (DSP), a microprocessor, a logic controller, logic circuits, and the like, or any combination of these, and may include analog circuit components and/or other components with respect to any particular implementation. Functions and components disclosed herein may operate in the digital domain and certain examples include analog-to-digital (ADC) conversion of analog signals generated by microphones, despite the lack of illustration of ADC's in the various figures. Such ADC functionality may be incorporated in or otherwise internal to a signal processor. Any suitable hardware and/or software, including firmware and the like, may be configured to carry out or implement components of the aspects and examples disclosed herein, and various implementations of aspects and examples may include components and/or functionality in addition to those disclosed.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A headphone system comprising:
- an acoustic transducer to convert a driver signal into an acoustic signal;
- a microphone to provide a feedback signal;
- a first processing component configured to process the feedback signal and provide an anti-noise signal, the anti-noise signal being related to the feedback signal by a first transfer function, and the driver signal being based at least in part upon the anti-noise signal;
- a filter to filter the driver signal and provide a reference signal, the filter configured to have a second transfer function that is inverse of the first transfer function; and
- a second processing component to compare the feedback signal to the reference signal to determine a feedback instability based upon the comparison.

2. The headphone system of claim 1 wherein the second processing component is configured to compare the feedback signal to the reference signal by calculating a cross-correlation.

3. The headphone system of claim 1 wherein the second processing component is configured to compare the feedback signal to the reference signal by calculating a first envelope of a sum of the comparison and feedback signals and calculating a second envelope of a difference between the comparison and feedback signals.

4. The headphone system of claim 3 wherein the second processing component is configured to compare the feedback signal to the reference signal by further calculating a ratio of the first envelope to the second envelope.

5. The headphone system of claim 1 wherein the second processing component is configured to determine the feedback instability in response to the comparison exceeding a threshold over a predetermined number of samples.

6. The headphone system of claim 1 wherein the second processing component is configured to compare the feedback signal to the reference signal over a predetermined frequency range.

7. The headphone system of claim 1 wherein the first processing component is further configured to cause one or more adjustments to one or more parameters responsive to the second processing component determining the feedback instability.

8. A method of detecting feedback instability in a noise control system, the method comprising:
- providing a driver signal to an acoustic transducer for conversion to an acoustic signal;
- receiving a feedback signal from a feedback microphone;
- processing the feedback signal through a feedback transfer function to provide an anti-noise signal;
- processing the driver signal through a filter having a transfer function that is inverse to the feedback transfer function, to provide a reference signal;
- comparing the feedback signal to the reference signal;
- determining whether the feedback signal has a threshold similarity to the reference signal; and
- indicating a feedback instability in response to determining that the feedback signal has a threshold similarity to the reference signal.

9. The method of claim 8 wherein determining whether the feedback signal has a threshold similarity to the reference signal comprises determining a similarity over a predetermined number of samples.

10. The method of claim 8 wherein determining whether the feedback signal has a threshold similarity to the reference signal comprises calculating a cross-correlation between the feedback signal and the reference signal.

11. The method of claim 8 wherein determining whether the feedback signal has a threshold similarity to the reference signal comprises calculating a first envelope of a sum of the reference signal and the feedback signal and calculating a second envelope of a difference between the reference signal and the feedback signal.

12. The method of claim 11 wherein quantifying the similarity further comprises calculating a ratio of the first envelope to the second envelope.

13. The method of claim 8 wherein the feedback signal and the reference signal are band limited to a predetermined frequency range.

14. The method of claim 8 further comprising generating one or more control signals for adjusting one or more parameters of the noise control system responsive to determining that the feedback signal has a threshold similarity to the reference signal.

15. A personal acoustic device comprising:
- an acoustic transducer to convert a driver signal into an acoustic signal;
- a microphone to provide a feedback signal;

a first filter to filter the feedback signal and provide an anti-noise signal, the driver signal being based at least in part upon the anti-noise signal;

a second filter to filter the driver signal and provide a reference signal, the second filter having an inverse response of the first filter; and a processing component to compare the feedback signal to the reference signal to determine a feedback instability based upon the comparison.

16. The personal acoustic device of claim 15 wherein the processing component is configured to compare the feedback signal to the reference signal by correlating the feedback signal and the reference signal.

17. The personal acoustic device of claim 16 wherein correlating the feedback signal and the reference signal comprises calculating a first envelope of a sum of the comparison and feedback signals and calculating a second envelope of a difference between the comparison and feedback signals.

18. The personal acoustic device of claim 17 wherein correlating the feedback signal and the reference signal further comprises calculating a ratio of the first envelope to the second envelope.

19. The personal acoustic device of claim 16 wherein the processing component is configured to determine the feedback instability in response to the correlation exceeding a threshold over a predetermined number of samples.

20. The personal acoustic device of claim 15 wherein the processing component is configured to compare the feedback signal to the reference signal over a predetermined frequency range.

* * * * *